April 14, 1925.

I. K. JOHNSON 1,533,916

BONDING RAIL JOINT

Filed May 23, 1924

WITNESSES

E. A. Wilson

Hugh H. Ott

INVENTOR

IRA K. JOHNSON

BY Munn & Co.

ATTORNEYS

Patented Apr. 14, 1925.

1,533,916

UNITED STATES PATENT OFFICE.

IRA K. JOHNSON, OF WEST CALDWELL, NEW JERSEY.

BONDING RAIL JOINT.

Application filed May 23, 1924. Serial No. 715,328.

*To all whom it may concern:*

Be it known that I, IRA K. JOHNSON, a citizen of the United States, and a resident of West Caldwell, in the county of Essex and State of New Jersey, United States of America, have invented a new and Improved Bonding Rail Joint, of which the following is a full, clear, and exact description.

This invention has relation to rail joints and has particular reference to a fish plate construction which in addition to performing its ordinary function serves to electrically connect the rails to each other.

At the present time, the fish plates which connect the rails together do not effectually establish electrical communication therebetween, that is, the communication established thereby is not sufficiently reliable to operate signals and therefore the rails are electrically connected by bonding devices such as wires or by gas welding the rail ends together.

It is, therefore, the outstanding object of the present invention to so construct the fish plates for joining the rail ends together as to provide means for establishing electrical communication without the necessity of using bonding devices or welding the rails.

The invention further comprehends a bonding rail connecting device which compensates for relative movement between the rail sections due to contraction and expansion.

The invention furthermore provides a bonding rail connecting means which serves as a detecting means in event of a loose or broken joint.

As a further object the invention contemplates a rail connecting and bonding device which is extremely simple in its construction, which does not materially increase the cost of production of the fish plates, and which serves as an effective and positive means for establishing electrical communication between the rails for conveying or conducting current from one to the other.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1:
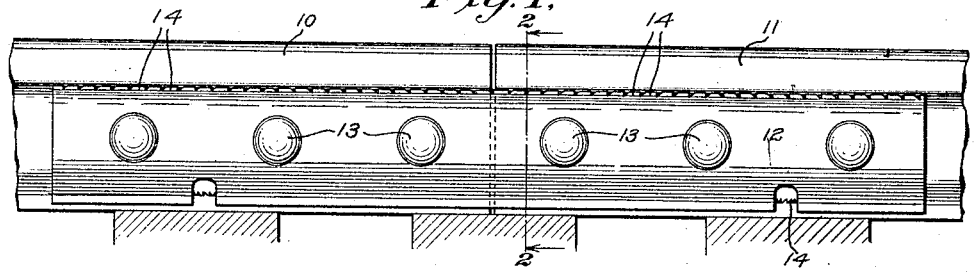
Figure 1 is a side view of the meeting ends of a pair of rails connected by a rail joining means constructed in accordance with the invention.
Figure 2:
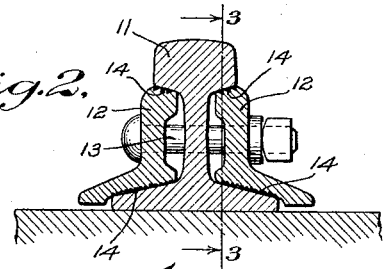
Fig. 2 is a cross sectional view therethrough taken approximately on the line indicated at 2—2 in Fig. 1.
Figure 3:
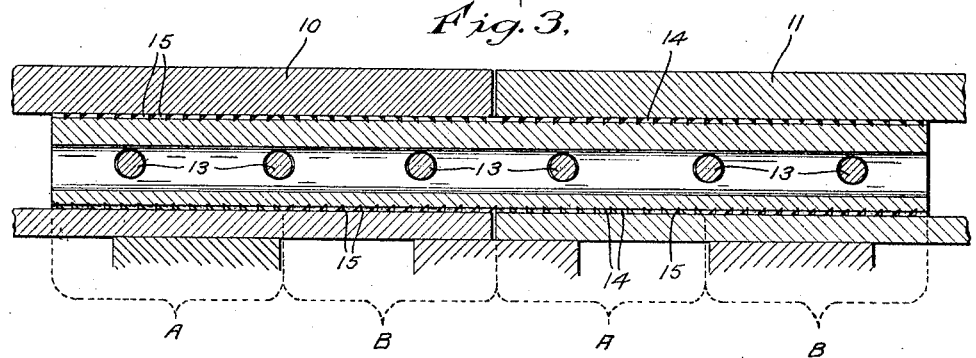
Fig. 3 is a sectional view taken approximately on the line indicated at 3—3 in Fig. 2.
Figure 4:
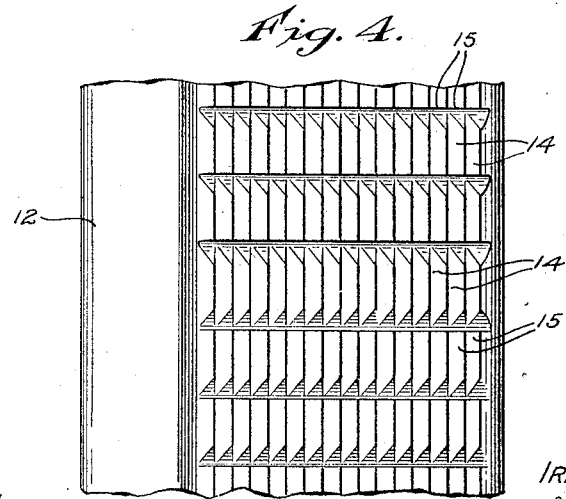
Fig. 4 is a fragmentary bottom view of a fish plate constructed in accordance with the invention.

Referring to the drawings by characters of reference, 10 and 11 designate the meeting ends of a pair of rails and 12 the fish plates which are employed for connecting the rails together by means of the transverse bolts 13. In order to establish a positive electrical communication between the rails, the fish plates in the present instance are serrated or otherwise provided with teeth 14 at the point of engagement of the fish plate with the rail flange and at the point of engagement of the fish plate with the under side of the rail head. In order to insure the proper biting engagement of the teeth 14 with the rail ends, and to compensate for relative movement of the rails due to contraction and expansion each engaging portion of the fish plate with each rail is formed with a plurality of sets of teeth indicated by the brackets A and B in which the points or leading edges 15 project in opposite longitudinal directions. Under this construction and arrangement it is evident that irrespective of the relative movement of the rail ends toward or away from each other, a biting action will be set up between the points or leading edges 15 of the teeth 14 and the portion of the rail with which they engage to positively bond the rails to insure electrical communication therebetween. It will be further observed that in event of the breakage or loosening of the fish plates 12, where the rails are carrying current for the operation of the signals, such a break or loosening will be indicated and thereby possibly avoid serious consequence.

From the foregoing it will thus be seen that an extremely simple and inexpensive improvement in rail bonding means has been provided and while the invention has been illustrated in its preferred embodiment, it is, of course, understood that variations which fall within the scope of the appended claims may be resorted to when found expedient.

I claim:

1. A rail joint comprising fish plates, oppositely disposed longitudinal sets of projecting teeth formed on said fish plates at the point of contact of the same with each rail whereby irrespective of the relative movement of the connected rail sections, said teeth set up a biting action to insure bonding of the rails and the establishment of electrical communication therebetween.

2. A rail joint comprising fish plates, oppositely disposed longitudinal sets of projecting teeth carried by said fish plates at the point of contact of the same with each rail whereby irrespective of the relative movement of the connected rail sections, said teeth set up a biting action to insure bonding of the rails and the establishment of electrical communication therebetween.

3. In devices for connecting railway rails, means carried by said devices for bonding said connected rails whereby to establish electrical communication therebetween, said means comprising elements formed with sets of oppositely projecting teeth at each point of contact with the rails whereby irrespective of the relative movement of the connected rail sections by contraction and expansion, the said teeth set up a biting action to insure a bonding of the rails and the establishment of electrical communication therebetween.

IRA K. JOHNSON.